United States Patent
Buermann

(10) Patent No.: US 6,782,683 B2
(45) Date of Patent: Aug. 31, 2004

(54) CUTTING MECHANISM FOR HARVESTERS

(75) Inventor: Dominik Buermann, Verl (DE)

(73) Assignee: CLAAS Selbstfahrende Erntemaschinen GmbH, Harsewinkel (DE)

(*) Notice: Subject to any disclaimer, the term of this patent is extended or adjusted under 35 U.S.C. 154(b) by 0 days.

(21) Appl. No.: 10/170,125

(22) Filed: Jun. 12, 2002

(65) Prior Publication Data

US 2003/0010010 A1 Jan. 16, 2003

(30) Foreign Application Priority Data

Jul. 12, 2001 (DE) .......................................... 101 33 105

(51) Int. Cl.$^7$ ............................................. A01D 34/30
(52) U.S. Cl. .................................................. 56/257
(58) Field of Search ........................ 56/257, 264, 268, 56/271, 15.8, 10.4, DIG. 10

(56) References Cited

U.S. PATENT DOCUMENTS

| | | | | |
|---|---|---|---|---|
| 25,194 A | * | 8/1859 | Hawkins ..................... | 56/187 |
| 1,451,140 A | * | 4/1923 | Brown ........................ | 56/15.8 |
| 2,513,703 A | * | 7/1950 | Annis ......................... | 56/10.4 |
| 2,915,870 A | * | 12/1959 | Hume ......................... | 56/208 |
| 3,324,639 A | * | 6/1967 | Halls et al. ................. | 74/568 R |
| 3,596,454 A | * | 8/1971 | Kluck ......................... | 56/314 |
| 3,699,754 A | * | 10/1972 | Koch et al. ................. | 56/15.8 |
| 3,747,311 A | * | 7/1973 | DeCoene et al. ............ | 56/208 |
| 4,270,337 A | * | 6/1981 | Pinto .......................... | 56/13.9 |
| 4,573,308 A | * | 3/1986 | Ehrecke et al. ............. | 56/14.4 |
| 4,660,360 A | * | 4/1987 | Hardesty et al. ............ | 56/208 |
| 5,924,270 A | * | 7/1999 | Bruns ......................... | 56/320.1 |

FOREIGN PATENT DOCUMENTS

DE          34 41 209 A1     5/1986

* cited by examiner

Primary Examiner—Thomas B. Will
Assistant Examiner—Alicia Torres
(74) Attorney, Agent, or Firm—Michael J. Striker

(57) ABSTRACT

A cutting mechanism for harvesters, both for harvesting grain and crop with low located crop positions has a cutter bar; a cutting mechanism trough; a plurality of skids arranged near one another in a traveling direction and connecting the cutter bar with the cutting mechanism trough, the skids being movable between an upper and a lower position in a vertical direction; an arresting device arranged in a front region and fixing the skids in the upper position, the connecting mechanism trough having framed parts; screw connections which mount the skids at their rear ends directly on the frame parts of the cutting mechanism trough; a road device which lifts the skids to the upper position and arrests the skids; the cutting mechanism trough having framed parts; rigid screw connections which mount the skids at their rear ends directly on the frame parts of the cutting mechanism trough; and means for arresting the skids in the upper position and selected from the group consisting of a rope device which lifts and arrests the skids in the upper position, a pivot hook and a cooperating mounting pin which arrests the skids in the upper position, and both.

3 Claims, 4 Drawing Sheets

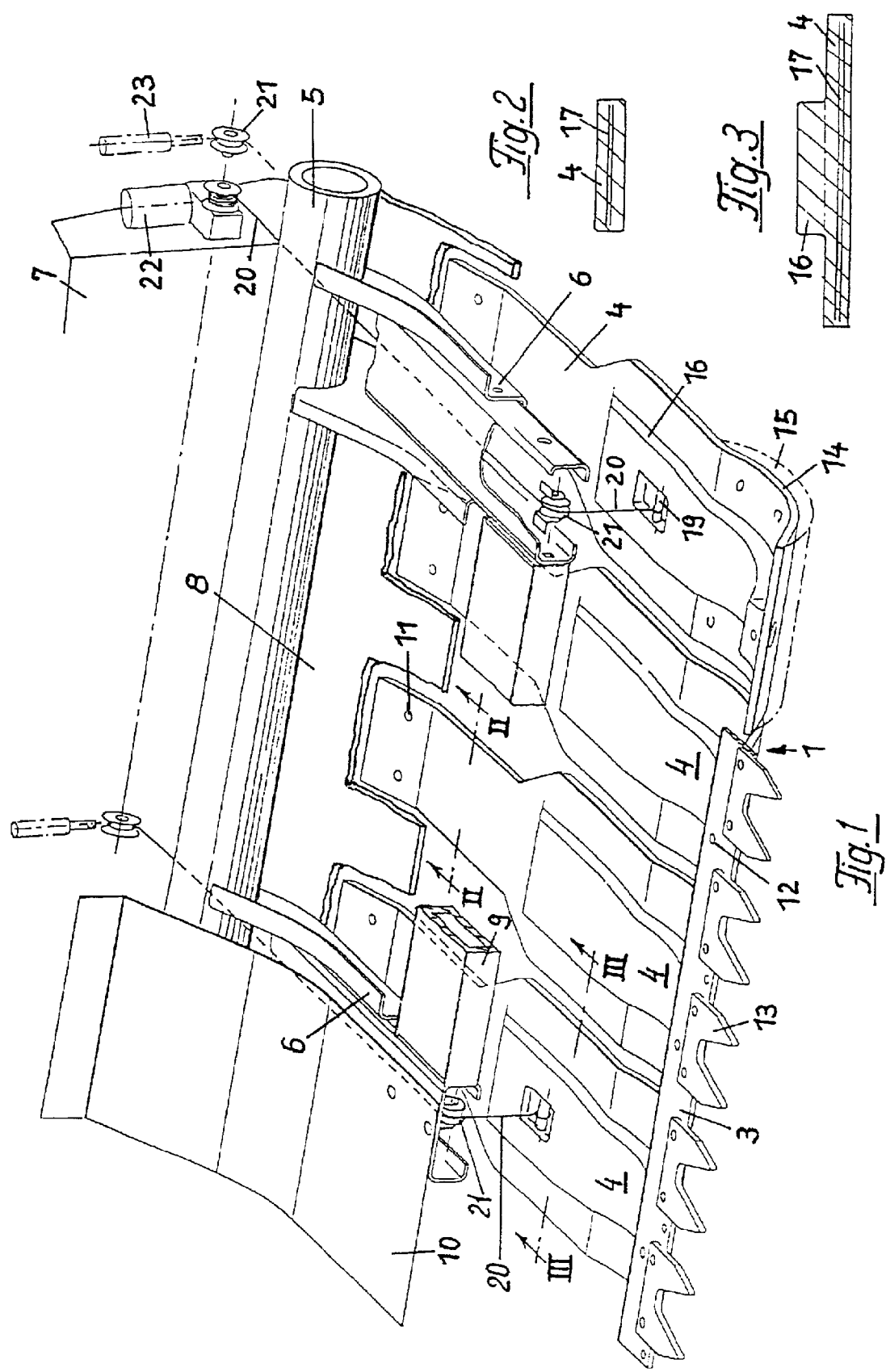

CUTTING MECHANISM FOR HARVESTERS

BACKGROUND OF THE INVENTION

The present invention relates to a cutting mechanism for harvesters, in particular for self propelled combined harvesters, for harvesting both grain as well as crop with low locating positions.

Such cutting mechanisms are known with selectively rigid or flexible cutter bars and knives in different embodiments. German patent document DE 34 41 209 A1 discloses a universal cutting mechanism which can be used for the grain harvesting and beans harvesting and has two skids which are pivotably connected with the trough of the cutting mechanism through corresponding supporting arms extending in a traveling direction. Both the supporting arms which carry the skids and also the skids are provided with throughgoing openings. Arresting screws extend through these throughgoing openings for grain harvesting and screwed with a threaded sleeve on a carrier of the trough of the cutting mechanism. Thereby no vertical movement of the skids with respect to the trough of the cutting mechanism is possible.

For bean harvesting, the screw connection is released, so that the skids can freely move in correspondence with a respective ground profile upwardly or downwardly. While this cutting mechanism substantially satisfies the functional requirements during harvesting, it also possesses various disadvantages. In particular, a plurality of available problem-sensitive hinge connections cause high maintenance and repair expenses. Moreover, during the conversion of the cutting mechanism to different a great work expense is needed. Due to the two supporting arms which are required for one skid, an additional high weight load is provided for the cutting mechanism. As a result of the unfavorable surface properties the skids, in particular on clay-containing soils, possess bad sliding properties.

SUMMARY OF THE INVENTION

Accordingly, it is an object of the present invention to provide a cutting mechanism for harvesting machines, in which the skids are designed and arranged so that a problem-free operation is guaranteed in all harvesting conditions, and a selection of conversion variants can be performed in a simple manner with low labor expense.

In keeping with these objects and with others which will become apparent hereinafter, one feature of the present invention resides, briefly stated, in a cutting mechanism for harvesting machines, in which the skids at their rear end are mounted through rigid screw connections directly on the frame parts of the trough of the cutting mechanism, and the skids are liftable and arrestable via a rope device in an upper position and/or the skids are arrestable via at least one pivot hook and at least one cooperating mounting pin in the upper position.

When in the cutting mechanism for harvesting machines the skids are designed in accordance with the present invention and provided with an arresting device in their upper position, a universal application of the cutting mechanism for various crops can be provided with a low manufacturing expense.

With the use of synthetic plastic, with the skids are made self-springy, so that a problematic mechanical hinge connection with the trough of the cutting mechanism is no longer needed.

The non-adhesive surface provides a substantially improved sliding over the field ground, in particular in wet and adhesive ground conditions.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a perspective view of a region of a cutting mechanism in accordance with the present invention with skids, which are brought via a rope device to an upper position and held there;

FIG. 2 is a view showing a section of the inventive cutting mechanism, taken along the line II—II in FIG. 1;

FIG. 3 is a view showing a section of the inventive cutting mechanism taken along the line III—III in FIG. 1;

DESCRIPTION OF THE PREFERRED EMBODIMENTS

Figure 4:
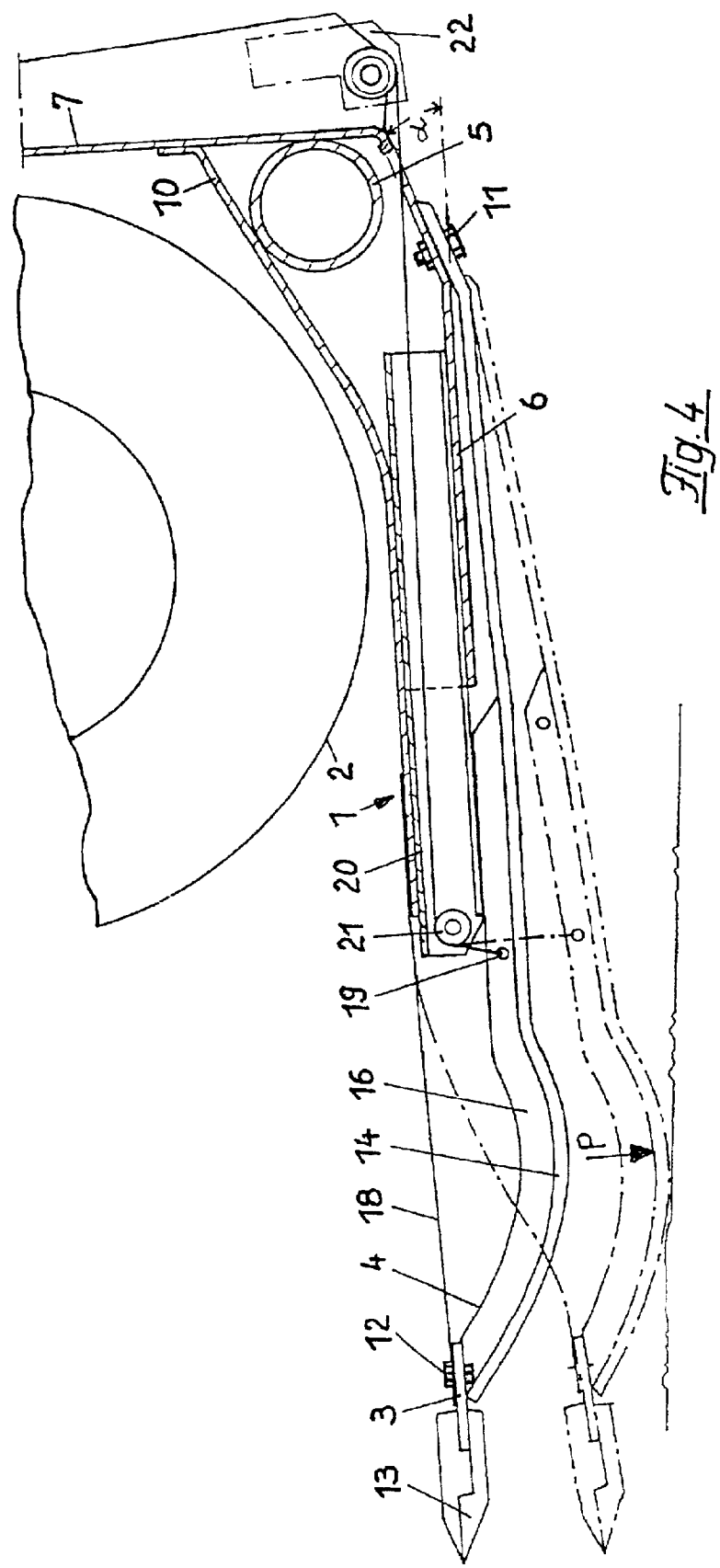
FIG. 4 is a view showing a cross-section through a lower region of an inventive cutting mechanism with skids, which in accordance with FIG. 1 is brought to an upper position by a rope device.

A cutting mechanism for cutting the crop is arranged at a front side of a not shown combined harvester. It includes substantially a cutting mechanism trough 1, a feed conveyor auger 2, a flexible cutter bar 3 with knives and a plurality of skids 4 arranged near one another. A supporting tube 5 which extends over the whole width is arranged in the rear lower region of the cutting mechanism trough 1. Substantially horizontally extending profiled ground supports 6 and a rear wall 7 are arranged on the supporting tube 5 and spaced from one another.

Transversely extending connecting plates 8 and profiled supports 9 are arranged between two neighboring ground supports 6 for stabilization of the cutting mechanism trough 1. A ground plate 10 is arranged above the connecting plates 8 and the profile supports 9. It extends over the whole width of the cutting mechanism trough 1 and is composed of individual sections.

The skids 4 which are composed of a self-springy and smooth-surface synthetic plastic with good sliding properties are fixedly mounted directly on the connecting plates 8 or other ground-side frame parts of the cutting mechanism trough 1. The front ends of the skids 4 are connected with the cutting bar 3 via screw connections 12. Cutting fingers 13 and a not shown knife are arranged in a known manner on the cutter bar 3. The skids 4 in a front region have a curvature 14 which is oriented toward a field ground and substantially produces a ground contact. Since this curvature 14 is subjected to a high load, it is provided at a bottom side with an additional exchangeable support 15. Thereby in the case of an occurring wear, a simple exchange of the support 15 provides again the full operational ability of the skids.

For increasing the resistance, the skids 4 at their upper side are provided with a molded or screwed reinforcement 16. In the greatly loaded region further inserts 17 are arranged as shown in FIGS. 2 and 3. They are composed of a high strength flexible material to provide armoring or reinforcement. This increases the resistance moment and the service life of the skids 4. Flexible plates 18 are arranged between the cutter bar 3 and the profiled supports 9. They follow the vertical movements of the skids 4 and guide the crop in direction of the feed conveyor auger 2.

The inventive cutting mechanism is suitable for harvesting both grain and also beans or other crops with low lying crop positions. During harvesting of grain the cutting mechanism is guided at a distance over the field ground and the knife cuts the stocks in a rectilinear plane. During harvesting of beans the cutting mechanism is lowered so far that the skids 4 have a ground contact over the whole cutting mechanism width and the flexible cutter bar 3 with the knives is adjusted transversely to the traveling direction elastically and springy to the constantly changing ground profile, and in all regions of the knife an optimal low cutting height is obtained. During conversion of the cutting mechanism from the bean harvesting to the grain harvesting, the vertical movability of the skids 4 is eliminated by bringing them to the lower side of the profiled support 9 and arresting in this position.

The arresting of the skids 4 is performed in two different embodiments. In the embodiment shown in FIGS. 1 and 4, the skids 4 are brought to their upper position by a rope device. For this purpose a pivot 19 and a rope 20 are mounted on each skid arranged in the lateral end region of the cutting mechanism and associated with a ground support 6. The rope 20 leads through deviating rollers 21 to a rotary drive 22 arranged on the rear wall 7 or to a pulling drive 23. In FIG. 1 the rotary drive 22 is shown solid lines and the pulling drive 23 is shown in dash-dot lines. Both electrically or hydraulically operated drives are controlled from a driver's cabin of the harvester.

The skids 4 are lifted by the rope drive until abutment against the profiled support 9 and are held in this position. Thereby no movement of the skids 4 is possible in the cutting mechanism usable for the grain harvesting. After removing the arresting, the skids 4 move downwardly to the field ground under the action of their own weight. In this position, the cutting mechanism is again usable for the bean harvesting.

Figure 5:
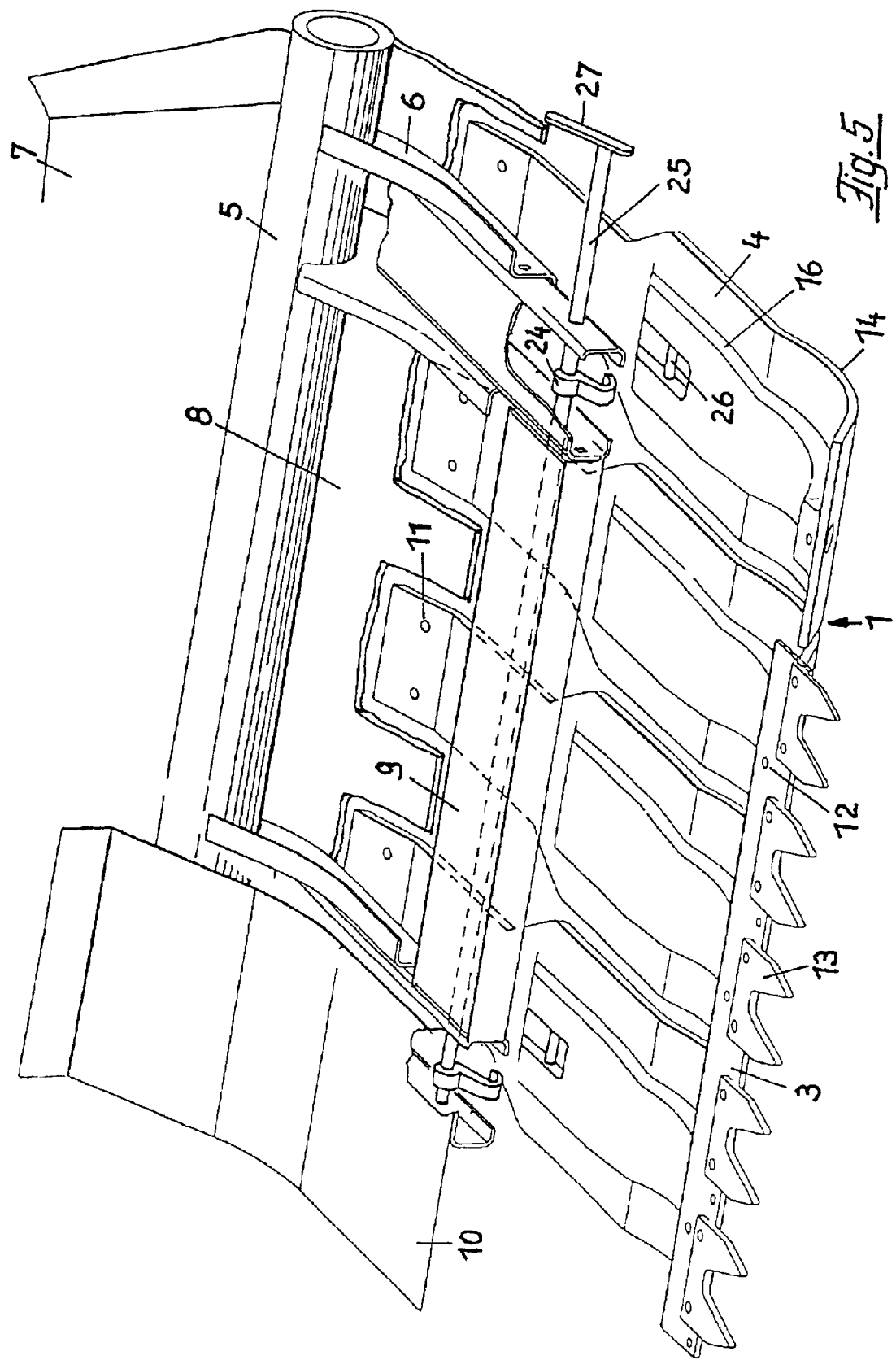
FIG. 5 is a perspective view of a lower region of an inventive cutting mechanism with skids, which are held by pivot hooks in the upper position.
Figure 6:
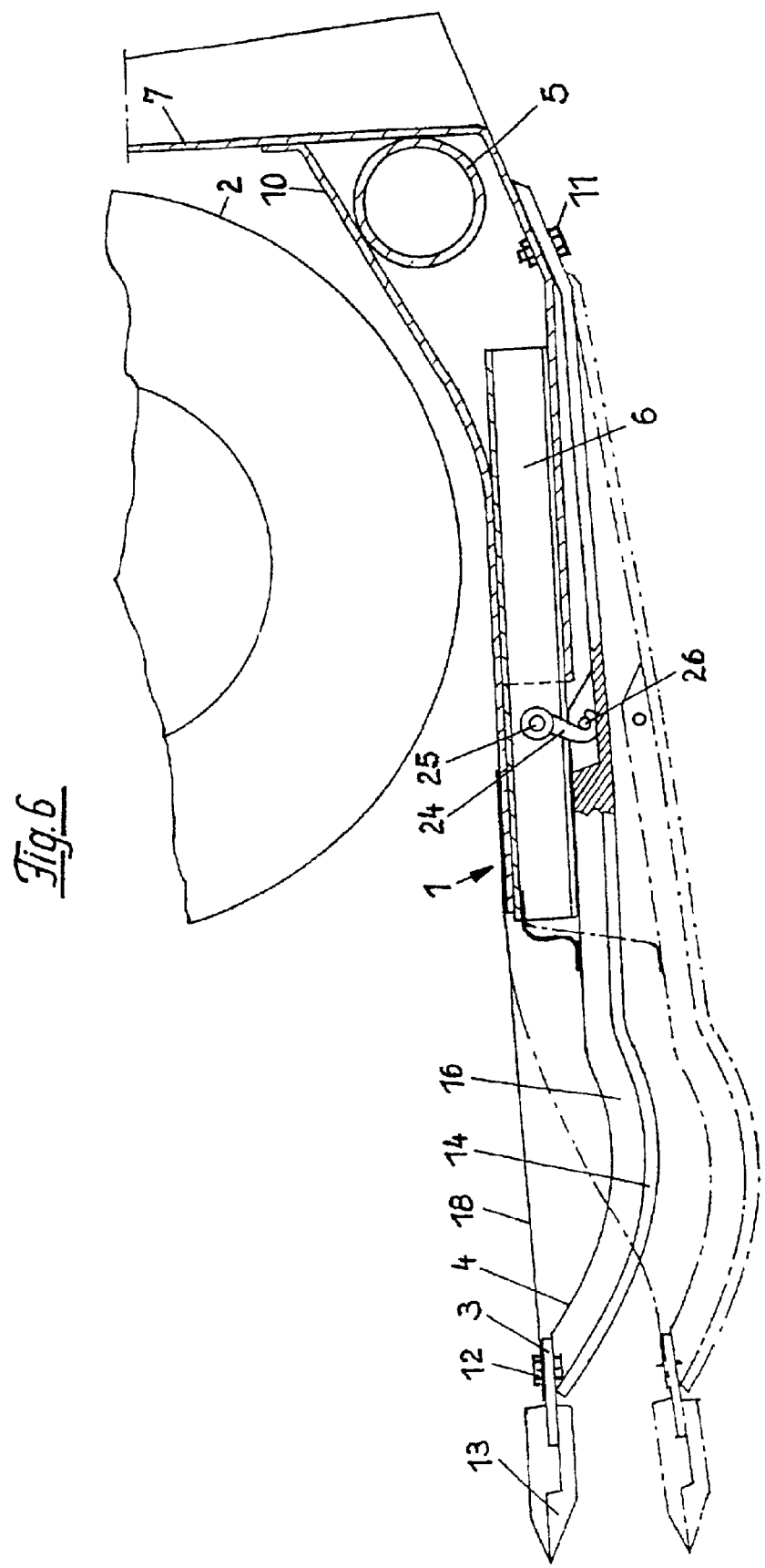
FIG. 6 is a view showing a transverse cross-section through a lower region of an inventive cutting mechanism with skids which are held as shown in FIG. 5 in an upper position with turning levers.

In the embodiment shown in FIGS. 5 and 6, the arresting of the skids 4 in the upper position is performed by a pivot hook 24. For this purpose the pivot hooks 24 arranged on a shaft 25 which extends in the profiled support 9 are lockable with the mounting pins 26 arranged on the skids 4. The pivot hooks 24 and the mounting pins 26 are associated with each ground support 6. Before the conversion of the cutting mechanism from the bean to the grain harvesting, the cutting mechanism is lowered to a flat ground surface. Thereby an abutment of the skids 4 on the lower side of the profiled support 9 is provided. With a handle lever arranged at the outer end of the shaft 25, the pivot hook 24 is turned downwardly and connected with the mounting pin 26 of the skid 4, so that the cutter bar 3 is held over its whole width in the upper end position. In this position the cutting mechanism can be used for the grain harvesting.

The releasing of arresting is performed by actuation of the hand lever 27. Thereby the shaft 25 is turned and the connection of the pivot hook 24 with the mounting pin 26 is interrupted, so that the skids 4 move downwardly to the field ground. The individual skids 4 can thereby move again in correspondence with the ground profile, independently from one another in a vertical direction, and the cutter bar 3 with the knives are guided at a small distance over the field ground during the bean harvesting.

For providing an unloading of the cutting mechanism which receives the skids 4 and the carrier vehicle through the skids 4, the ground pressure p which is applied by the skids 4 to the ground is adjustable. In accordance with the first embodiment shown in FIG. 4, this can be performed by changing the mounting angle α under the corresponding skid 4 in its rear region with the frame part 8 of the cutting mechanism trough 1. It is within the spirit of the present invention to perform this change of the mounting angle α by changing the inclination angle of the rear end of the skid 4 or by introduction of wedge-shaped spacers in the region of the screw connections 11 between the frame part 8 of the cutting mechanism trough 1 and the corresponding skid 4. In accordance with a further not shown embodiment the change of the ground pressure p of one or several skids 4 can be obtained in that the skids 4 are used with different material thicknesses and/or with different material properties.

It will be understood that each of the elements described above, or two or more together, may also find a useful application in other types of constructions differing from the types described above.

While the invention has been illustrated and described as embodied in cutting mechanism for harvesters, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. A cutting mechanism for harvesters, for harvesting both grain and crop with low located crop positions, comprising a cutter bar; a cutting mechanism trough; a plurality of skids arranged near one another in a traveling direction and connecting said cutter bar with said cutting mechanism trough, said skids being movable between an upper and a lower position in a vertical direction or arrestable in the upper position by an arresting device arranged in a front region, said cutting mechanism trough having frame parts; rigid screw connections which mount said skids at their rear ends directly on said frame parts of said cutting mechanism trough; and means for arresting said skids in the upper position and selected from the group consisting of a rope device which lifts and arrests said skids in the upper position, at least one pivot hook with at least one cooperating mounting pin which arrests said skids in the upper position, and both, said at least one pivot hook being arranged on a shaft extending inside a profile support in a region of a back ground support, and said at least one mounting pin is mounted in said skid located directly underneath; and a hand lever arranged at an outer end of said shaft.

2. A cutting mechanism as defined in claim 1, wherein a plurality of said pivot hooks and said mounting pins associated with said pivot hooks are associated with said throughgoing shaft.

3. A cutting mechanism for harvesters, for harvesting both grain and crop with low located crop positions, comprising a cutter bar; a cutting mechanism trough; a plurality of skids arranged near one another in a traveling direction and connecting said cutter bar with said cutting mechanism trough, said skids being movable between an upper and a lower position in a vertical direction or arrestable in the upper position by an arresting device arranged in a front region, said cutting mechanism trough having frame parts; rigid screw connections which mount said skids at their rear ends directly on said frame parts of said cutting mechanism trough; and means for arresting said skids in the upper position and selected from the group consisting of a rope device which lifts and arrests said skids in the upper position, at least one pivot hook with at least one cooperating mounting pin which arrests said skids in the upper position, and both; and another such rope device, said rope devices being arranged in lateral regions of the cutting mechanism, at least one of said rope devices including a rope mounted on a pin of said skid associated with a ground support, said rope leading over deviating rollers to a drive arranged at a rear wall and formed as a drive selected from the group consisting of a rotary drive and a pulling drive.

* * * * *